United States Patent
Tokizawa (10) Patent No.: US 9,899,887 B2
(45) Date of Patent: Feb. 20, 2018

(54) ROTATING ELECTRIC MACHINE STATOR WITH MULTI-PHASE COIL HAVING PHASE WINDING COIL END PORTIONS WITH DIFFERENT OBLIQUE ANGLES

(71) Applicant: DENSO CORPORATION, Kariya, Aichi-pref. (JP)

(72) Inventor: Takashi Tokizawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 14/601,375

(22) Filed: Jan. 21, 2015

(65) Prior Publication Data
US 2015/0229174 A1 Aug. 13, 2015

(30) Foreign Application Priority Data
Feb. 7, 2014 (JP) ................. 2014-022367

(51) Int. Cl.
H02K 3/00 (2006.01)
H02K 3/12 (2006.01)
H02K 3/28 (2006.01)
H02K 15/00 (2006.01)

(52) U.S. Cl.
CPC ............. *H02K 3/12* (2013.01); *H02K 3/00* (2013.01); *H02K 3/28* (2013.01); *H02K 15/0031* (2013.01); *H02K 2213/03* (2013.01)

(58) Field of Classification Search
CPC .. H02K 3/12; H02K 3/14; H02K 3/28; H02K 3/00–3/52; H02K 15/15; H02K 15/00–15/16
USPC ........... 310/179–208; 29/596, 598, 606, 605, 29/603.23–603.26
See application file for complete search history.

(56) References Cited

U.S. PATENT DOCUMENTS

| | | | | |
|---|---|---|---|---|
| 4,401,907 A | * | 8/1983 | Nozawa | H02K 3/04 29/596 |
| 5,619,787 A | * | 4/1997 | Couture | H02K 3/12 29/596 |
| 5,955,810 A | * | 9/1999 | Umeda | H02K 1/165 310/201 |

(Continued)

FOREIGN PATENT DOCUMENTS

| | | |
|---|---|---|
| JP | 2009-247199 A | 10/2009 |
| JP | 2010-075035 A | 4/2010 |

(Continued)

*Primary Examiner* — Bernard Rojas
*Assistant Examiner* — Maged Almawri
(74) *Attorney, Agent, or Firm* — Oliff PLC (57) ABSTRACT

A stator includes a multi-phase stator coil comprised of phase windings. Each of the phase windings is formed of a continuous electric conductor and includes in-slot portions and coil end portions. Each of the in-slot portions is received in one of slots of a stator core. Each of the coil end portions is located outside the slots so as to connect one adjacent pair of the in-slot portions. Each of the coil end portions includes at least one oblique part that extends obliquely at an oblique angle with respect to either an axial direction or a circumferential direction of the stator core. The oblique angles of the oblique parts of the coil end portions in at least one of the phase windings of the stator coil are set to be different from the oblique angles of the oblique parts of the coil end portions in the other phase windings.

5 Claims, 9 Drawing Sheets

(56) References Cited

U.S. PATENT DOCUMENTS

| | | | | |
|---|---|---|---|---|
| 5,986,375 A * | 11/1999 | Umeda | | H02K 1/165 310/180 |
| 6,285,105 B1 * | 9/2001 | Asao | | H02K 3/12 310/179 |
| 6,787,961 B2 * | 9/2004 | Neet | | H02K 3/24 310/201 |
| 7,800,273 B2 * | 9/2010 | Shichijoh | | H02K 3/50 310/208 |
| 7,825,562 B2 * | 11/2010 | Naganawa | | H02K 15/063 310/184 |
| 8,174,160 B2 * | 5/2012 | Stiesdal | | H02K 3/12 310/184 |
| 2002/0030417 A1 * | 3/2002 | Asao | | H02K 3/12 310/201 |
| 2004/0119361 A1 * | 6/2004 | Neet | | H02K 3/24 310/208 |
| 2005/0168093 A1 * | 8/2005 | Higashino | | H02K 3/12 310/184 |
| 2008/0079328 A1 * | 4/2008 | Shichijoh | | H02K 3/28 310/184 |
| 2010/0077599 A1 | 4/2010 | Tokizawa | | |
| 2010/0117480 A1 * | 5/2010 | Ishizuka | | H02K 3/12 310/207 |
| 2010/0141078 A1 * | 6/2010 | Kouda | | H02K 3/12 310/195 |
| 2011/0000078 A1 | 1/2011 | Gorohata et al. | | |
| 2011/0041319 A1 | 2/2011 | Gorohata et al. | | |
| 2011/0210638 A1 * | 9/2011 | Ogawa | | H02K 3/12 310/195 |
| 2012/0007462 A1 * | 1/2012 | Kouda | | H02K 3/12 310/206 |
| 2012/0200191 A1 * | 8/2012 | Baba | | H02K 3/12 310/201 |

FOREIGN PATENT DOCUMENTS

| | | |
|---|---|---|
| JP | 2010-110199 A | 5/2010 |
| JP | 2011-182509 A | 9/2011 |

* cited by examiner

ROTATING ELECTRIC MACHINE STATOR WITH MULTI-PHASE COIL HAVING PHASE WINDING COIL END PORTIONS WITH DIFFERENT OBLIQUE ANGLES

CROSS-REFERENCE TO RELATED APPLICATION

This application is based on and claims priority from Japanese Patent Application No. 2014-22367 filed on Feb. 7, 2014, the content of which is hereby incorporated by reference in its entirety into this application.

BACKGROUND

1 Technical Field

The present invention relates generally to stators for rotating electric machines that are used in, for example, motor vehicles as electric motors and electric generators. More particularly, the invention relates to a stator for an automotive alternator which includes a multi-phase stator coil.

2 Description of Related Art

Conventionally, various types of stators for rotating electric machines have been provided for practical use.

For example, there is disclosed a stator for an automotive alternator in Japanese Patent Application Publication No. JP2010110199A. The stator includes a hollow cylindrical stator core having a plurality of slots arranged in its circumferential direction and a three-phase stator coil that is mounted in the slots of the stator core so as to have, as a whole, a hollow cylindrical shape.

Moreover, the stator coil is comprised of a plurality of phase windings, each of which is formed of a continuous electric conductor and includes a plurality of in-slot portions and a plurality of coil end portions (to be also referred to as bridging portions or turn portions hereinafter). Each of the in-slot portions is received in a corresponding one of the slots of the stator core. Each of the coil end portions is located outside the slots of the stator core so as to connect one circumferentially-adjacent pair of the in-slot portions which are respectively received in two different slots of the stator core.

In recent years, rotating electric machines for installation in a limited space, such as automotive alternators, have been required to have a smaller size and higher performance than ever before. Moreover, to reduce the size and improve the performance of a rotating electric machine, it is necessary to improve the space factor of the stator coil in the slots of the stator core and arrange the coil end portions outside the slots in alignment, small size and high density.

To meet the above requirement, there have been developed various methods and apparatuses for manufacturing stators. Among them, in terms of prioritizing manufacturing efficiency, a method is mainly used according to which the stator coil is first formed to have a predetermined shape and then mounted to the stator core.

However, in the case of using the above method, there are the following two problems.

First, due to the dimensional tolerances of raw materials and the manufacturing tolerances of the stator coil and the stator core, in mounting the stator coil to the stator core, an undesirable load may be imposed on the stator coil, thereby lowering the insulating properties of the stator coil. For example, the coil end portions of the phase windings of the stator coil may interfere with one other, thereby damaging insulating coats formed on the outer surfaces of the phase windings.

Secondly, there occurs variation in the mounting strength (or winding strength) of the stator coil to the stator core. In other cases, it is desired to set the mounting strength as needed. For example, when an abutting load higher than a threshold value is applied between the side surfaces of the electric conductors forming the phase windings of the stator coil and the inner wall surfaces of the slots of the stator core, vibration of the stator core, which is caused by magnetic force generating magnetic noise, may cause the stator coil to resonate therewith, thereby damaging the stator coil. In contrast, with a suitable abutting load applied between the side surfaces of the electric conductors and the inner wall surfaces of the slots, the rigidity of the stator core can be improved.

To solve the above first problem, one may consider increasing the thickness of the insulating coats of the electric conductors and widening the gaps between the coil end portions of the phase windings of the stator coil. However, in this case, the space factor of the stator coil in the slots of the stator core would be lowered and the axial length (or height) of the coil end portions would be increased. Consequently, it would become difficult to increase the output and reduce the size of the rotating electric machine.

On the other hand, to solve the above second problem, one may consider employing different types of stator coils according to the need. However, in this case, preparing a number of different types of stator coils would result in an increase in the manufacturing cost.

SUMMARY

To solve the above problems, the inventor of the present invention has thoroughly investigated the state of a multi-phase stator coil mounted on a stator core and found out the following features of the coil end portions of the phase windings of the stator coil.

(1) The phase windings of the stator coil cross (or extend obliquely with respect to) a radial direction of the stator core at the coil end portions (or bridging portions) thereof.

(2) The radial length (or the radial width of the obliquely-extending regions) of the coil end portions is limited, which depends on the number of the electric conductors received in each slot of the stator core, whereas there is a flexibility in setting the circumferential length of the coil end portions (or the circumferential pith between the in-slot portions connected by the coil end portions).

The present invention has been made based on the above findings by the inventor.

According to an exemplary embodiment, there is provided a stator for a rotating electric machine. The stator includes a hollow cylindrical stator core and a multi-phase stator coil. The stator core has a plurality of slots that are formed in a radially inner surface of the stator core so as to be spaced from one another in a circumferential direction of the stator core. The stator coil is comprised of a plurality of phase windings. Each of the phase windings is formed of a continuous electric conductor and includes a plurality of in-slot portions and a plurality of coil end portions. Each of the in-slot portions is received in a corresponding one of the slots of the stator core. Each of the coil end portions is located outside the slots of the stator core so as to connect one circumferentially-adjacent pair of the in-slot portions. The stator coil is mounted on the stator core so that for each of the phase windings, radial positions of the in-slot portions of the phase winding in the corresponding slots alternate between a radially inner position and a radially outer position in the circumferential direction of the stator core. Each of the coil end portions of the phase windings includes at least one oblique part that extends obliquely at an oblique angle with respect to either an axial direction of the stator core or the circumferential direction of the stator core. The oblique angles of the oblique parts of the coil end portions in at least one of the phase windings of the stator coil are set to be different from the oblique angles of the oblique parts of the coil end portions in the other phase windings.

With the above configuration, when the circumferential pitch between the in-slot portions is deviated from a desired value in at least one of the phase windings of the stator coil, it is possible to correct the deviation of the circumferential pitch by adjusting (or suitably setting) the oblique angles of the oblique parts of the coil end portions in the at least one of the phase windings. That is, it is possible to correct the deviation of the circumferential pitch while keeping the axial length and radial width of the coil end portions of the phase windings almost unchanged. Consequently, it is possible to prevent interference between the coil end portions of the phase windings of the stator coil. Moreover, it is also possible to secure a suitable abutting load between the side surfaces of the electric conductors forming the phase windings of the stator coil and the inner wall surfaces of the slots of the stator core, thereby preventing resonance of the stator coil with vibration of the stator core and improving the rigidity of the stator core. As a result, it is possible to secure a small size, high space factor and high reliability of the stator.

Each of the phase windings of the stator coil may be wave-shaped so that the coil end portions of the phase winding are located alternately on opposite axial sides of the stator core in the circumferential direction of the stator core.

In a further implementation, each of the coil end portions of the phase windings of the stator coil has a mountain-like shape tapering axially outward. For each of the coil end portions of the phase windings, the at least one oblique part of the coil end portion includes a pair of first oblique parts and one second oblique part. Each of the first oblique parts extends obliquely with respect to the axial direction of the stator core and constitutes one side of the mountain-like shape of the coil end portion. The second oblique part extends obliquely with respect to a radial direction of the stator core and constitutes an apex of the mountain-like shape which connects the pair of first oblique parts.

The oblique angles of the first oblique parts of the coil end portions in the at least one of the phase windings of the stator coil may be set to be different from the oblique angles of the first oblique parts of the coil end portions in the other phase windings.

Alternatively or simultaneously, the oblique angles of the second oblique parts of the coil end portions in the at least one of the phase windings of the stator coil may be set to be different from the oblique angles of the second oblique parts of the coil end portions in the other phase windings.

Preferably, each of the first oblique parts may be stair-shaped to include a plurality of step parts that each extend substantially parallel to a corresponding axial end face of the stator core and are spaced from one another in the axial direction of the stator core.

It is preferable that the second oblique part extends substantially parallel to the corresponding axial end face of the stator core.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings:

FIGS. 5A and 5B are enlarged views together illustrating the basic configuration of the stator coil, wherein FIG. 5A is an enlarged view of part of the stator along an axial direction of the stator core, and FIG. 5B is an enlarged view of the part of the stator from a radially inside of the stator core;

FIGS. 6A and 6B are enlarged views together illustrating a first method of adjusting the circumferential pitch between in-slot portions of each phase winding of the stator coil, wherein FIG. 6A is an enlarged view of part of the stator along the axial direction of the stator core, and FIG. 6B is an enlarged view of the part of the stator from the radially inside of the stator core;

DESCRIPTION OF EMBODIMENT

Figure 1A:
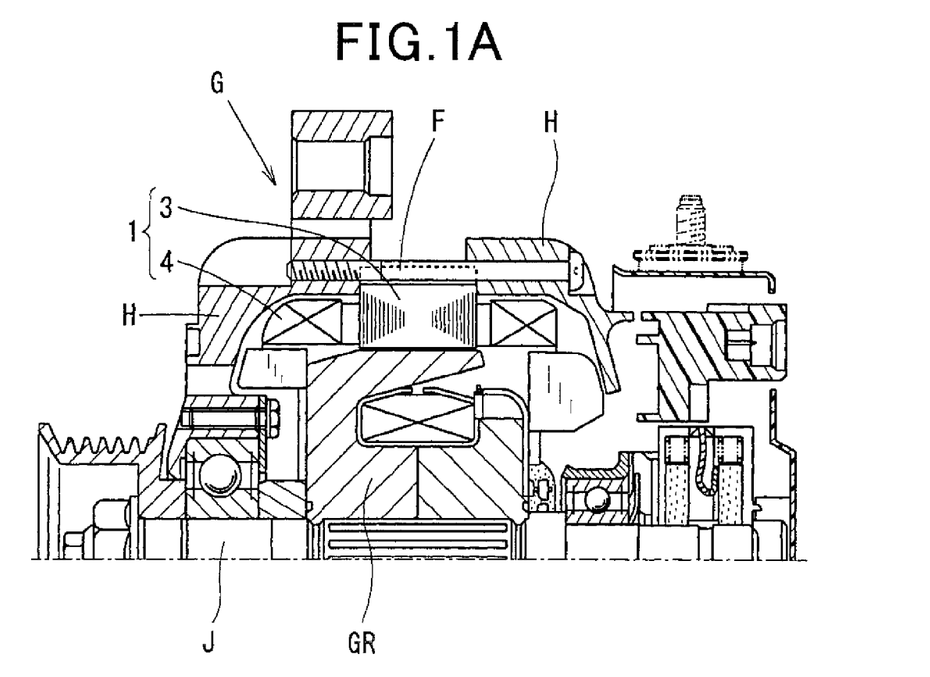
FIG. 1A is a schematic cross-sectional view of an upper half of an automotive alternator which includes a stator according to the exemplary embodiment.
Figure 1B:
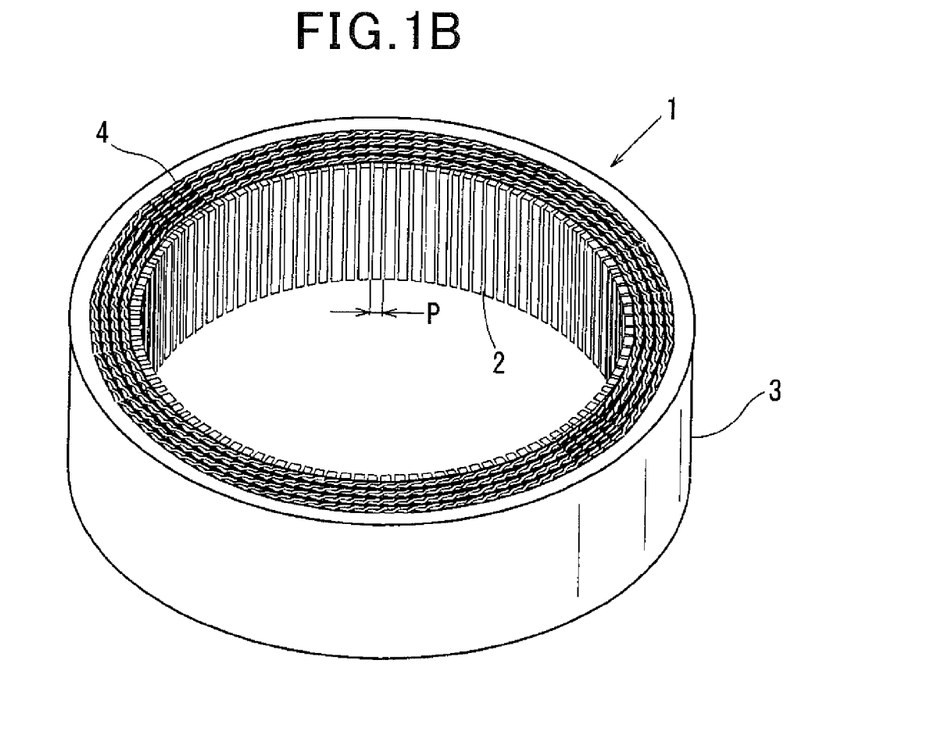
FIG. 1B is a perspective view of the stator.

FIG. 1A shows the overall configuration of a rotating electric machine which includes a stator 1 according to an exemplary embodiment. FIG. 1B shows the overall configuration of the stator 1.

In the present embodiment, the rotating electric machine is configured as an automotive alternator, i.e., an AC generator G for use in a motor vehicle, such as a passenger car or a truck.

As shown in FIG. 1A, the alternator G further includes a rotating shaft J, a rotor GR and a pair of substantially cup-shaped housings (or frames) H in addition to the stator 1. The rotating shaft J is configured to be driven by an internal combustion engine (not shown in the figures) of the vehicle. The rotor GR is mounted on the rotating shaft J so as to rotate together with the rotating shaft J. The pair of housings H are assembled together by a plurality of bolts F, so as to have the stator 1 fixedly held (or retained) therebetween.

In addition, in the alternator G, the rotor GR functions as a field, while the stator 1 functions as an armature.

As shown in FIG. 1B, the stator 1 includes a hollow cylindrical stator core 3 and a three-phase stator coil 4. The stator core 3 has a plurality of slots 2 that are formed in a radially inner surface of the stator core 3 so as to be spaced from one another at a predetermined pitch P in a circumferential direction of the stator core 3. The pitch P will be referred to as slot pitch P hereinafter. Moreover, each of the slots 2 extends in an axial direction of the stator core 3 and has its depth direction coinciding with a radial direction of the stator core 3. The stator coil 4 is mounted on the stator core 3 so as to be received in the slots 2 of the stator core 3. Consequently, the stator coil 4 is also given a hollow cylindrical shape.

In addition, the stator core 3 is sandwiched between the pair of housings H such that the radially outer surface of the stator core 3 is exposed to the external environment of the alternator G.

Figure 2:
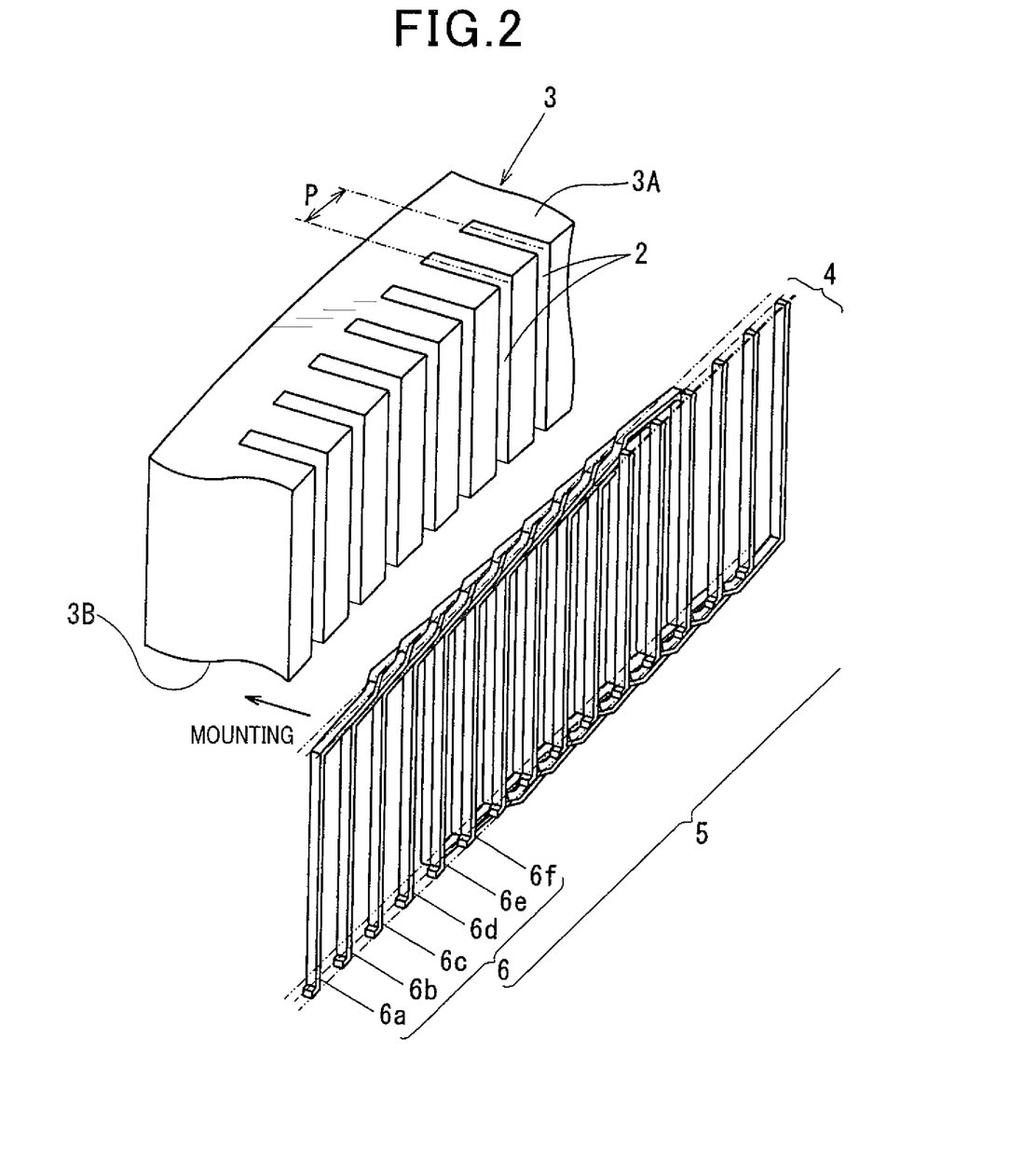
FIG. 2 is an enlarged development view of both part of a stator core and part of a stator coil, wherein the stator coil is being mounted to the stator core to together form the stator.

Referring now to FIG. 2, in the present embodiment, the stator coil 4 is constituted of a wire assembly 5. Further, the wire assembly 5 is formed of a plurality of wire members 6. The number of the wire members 6 included in the wire assembly 5 depends on the number of phase windings of the stator coil 4. More particularly, in the present embodiment, the wire assembly 5 includes, for example, six wire members 6a-6f.

The wire assembly 5 may be formed by a method disclosed in, for example, Japanese Patent Application Publication No. JP2010110199A. According to the method, the wire members 6a-6f, each of which has a predetermined length, are together wound continuously from their respective winding start ends to winding finish ends into a helical wire assembly. Then, the helical wire assembly is expanded in its longitudinal direction so that those portions of the wire assembly which are to be received in the slots 2 of the stator core 3 are arranged at a predetermined pitch as shown in FIG. 2. Thereafter, the wire assembly 5 is mounted to the stator core 3, thereby being transformed into the hollow cylindrical stator coil 4. In addition, those portions (coil end portions) of the wire assembly 5 which are located outside the slots 2 protrude from axial end faces 3A and 3B of the stator core 3.

Figure 3:
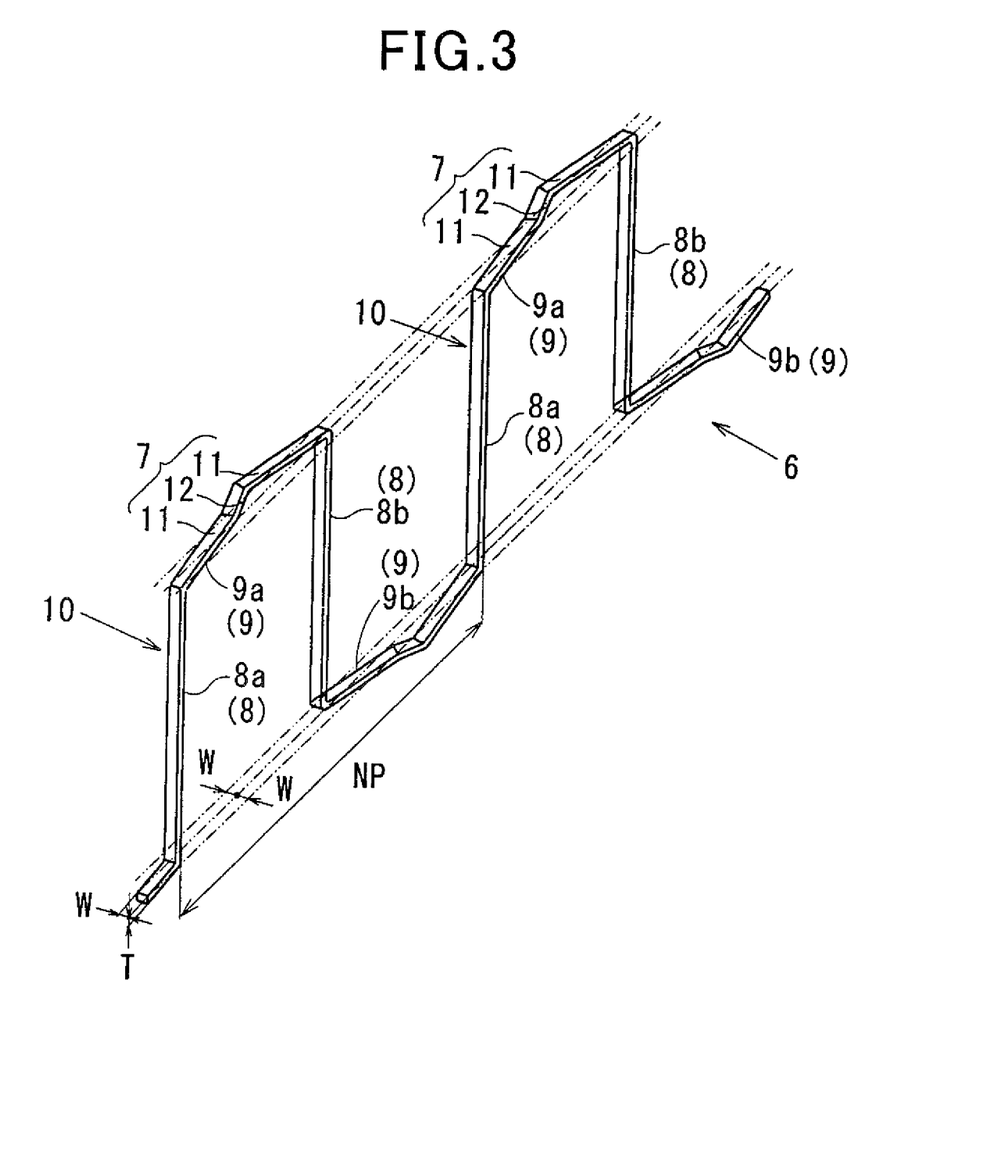
FIG. 3 is a perspective view illustrating the configuration of wire members of which the stator coil is formed.

More specifically, before the winding step, each of the wire members 6 is formed to include a plurality of S-shaped portions. Then, in the winding step, each of the wire members 6 is continuously helically wound so that the S-shaped portions make up turn portions 9 (i.e., coil end portions 7) of the wire assembly 6. Thereafter, each of the wire members 6 is expanded so that those portions of the wire assembly 6, which extended obliquely with respect to the axial direction of the helical wire assembly, are transformed into straight portions 8 (i.e., in-slot portions 10). Consequently, as shown in FIG. 3, each of the wire members 6 has first straight portions 8a located on a first plane, second straight portions 8b located on a second plane, first turn portions 9a connecting adjacent pairs of the first and second straight portions 8a and 8b on one side (i.e., the upper side in FIG. 3) of the straight portions 8a and 8b, and second turn portions 9b connecting adjacent pairs of the first and second straight portions 8a and 8b on the other side (i.e., the lower side in FIG. 3) of the straight portions 8a and 8b. The first and second planes, on which the first straight portions 8a and the second straight portions 8b are respectively located, extend parallel to each other with a predetermined gap provided therebetween.

Moreover, as shown in FIG. 3, each of the wire members 6 has a plurality of identical sections repeated at a predetermined pitch NP in its longitudinal direction. The predetermined pitch NP represents the interval between each adjacent pair of the first straight portions 8a on the first plane (or between each adjacent pair of the second straight portions 8b on the second plane). The pitch NP is N times the slot pitch P, where N is a natural number. Moreover, every two adjacent straight portions 8a and 8b, which are respectively located on the first and second planes and circumferentially apart from each other by (NP/2), are radially offset from each other by an amount substantially equal to the width W of the wire members 6. The straight portions 8a and 8b are arranged alternately at inner layers (i.e., on the radially inner side) and outer layers (i.e., on the radially outer side) in the slots 2 of the stator core 3. Moreover, the six wire members 6a-6f are arranged parallel to and circumferentially offset by the slot pitch P from one another. Consequently, the straight portions 8a and 8b of the wire members 6 are mounted on the stator core 3 so as to be radially stacked in layers in the slots 2 of the stator core 3. For example, in each of the slots 2, there are stacked, at least in a radial direction of the stator core 3, the straight portions 8a and 8b of the wire members 6 which belong to the same phase.

After being mounted to the stator core 3, each of the wire members 6 has a plurality of in-slot portions 10 and a plurality of coil end portions 7. Each of the in-slot portions 10 is constituted by one of the straight portions 8a and 8b of the wire member 6 and received in one of the slots 2 of the stator core 3. Each of the coil end portions 7 is constituted by one of the turn portions 9a and 9b of the wire member 6 and located outside the slots 2 of the stator core 3 to connect (or bridges) one adjacent pair of the in-slot portions 10 of the wire member 6. When viewed along one circumferential direction (i.e., either clockwise or counterclockwise direction), the coil end portions (or bridging portions) 7 include those coil end portions 7 which connect the in-slot portions 10 from the inner layers to the outer layers of the slots 2 and those coil end portions 7 which connect the in-slot portions 10 from the outer layers to the inner layers of the slots 2. The coil end portions 7 protrude from the axial end faces 3A and 3B of the stator core 3 and overlap and cross one another.

In the present embodiment, each of the coil end portions 7 has a mountain-like shape (or substantially triangular shape) tapering axially outward. Each of the coil end portions 7 includes a pair of first oblique parts 11 and one second oblique part 12, i.e., a total of three oblique parts. Each of the first oblique parts 11 extends obliquely with respect to the axial direction of the stator core 3 and constitutes one side of the mountain-like shape of the coil end portion 7. The second oblique part 12 extends obliquely with respect to a radial direction of the stator core 3 and constitutes the apex of the mountain-like shape which connects the pair of first oblique parts 11.

Each of the wire members 6 is a long electric conductor, such as a copper wire with an insulating coat covering its outer surface. The electric conductor may have, for example, a circular or rectangular cross-sectional shape. In the present embodiment, the electric conductor has a rectangular cross-sectional shape and satisfies the following dimensional relationship: W<T, where W and T are respectively the width and thickness of the electric conductor. Further, in this case, it is preferable to set the gap between the first and second planes (or the amount of radial offset between every two adjacent straight portions 8a and 8b) to be substantially equal to W.

As described previously, in the present embodiment, the stator coil 4 is formed of a plurality of continuous electric conductors. Each of the electric conductors has a plurality of in-slot portions 10 (or straight portions 8a and 8b) and a plurality of coil end portions 7 (or turn portions 9a and 9b). Each of the in-slot portions 10 is received in a corresponding one of the slots 2 of the stator core 3. Each of the coil end parts 7 is located outside the slots 2 to connect one circumferentially-adjacent pair of the in-slot portions 10. Moreover, the in-slot portions 10 are located at either a radially inner position (or radially inner layer) or a radially outer position (or radially outer layer) in the corresponding slots 2 of the stator core 3. Further, the radial positions of the in-slot portions 10 in the corresponding slots 2 alternate between the radially inner and outer positions in the circumferential direction of the stator core 3. In other words, the in-slot portions 10 are radially offset from one another outward and inward alternately in the circumferential direction.

That is, in the present embodiment, the stator coil 4 is wave-wound around the stator core 3 so that for each of the electric conductors forming the stator coil 4, the coil end portions 7 (or turn portions 9a and 9b) of the electric conductor are located alternately on opposite axial sides of the stator core 3 in the circumferential direction of the stator core 3.

Figure 4A:
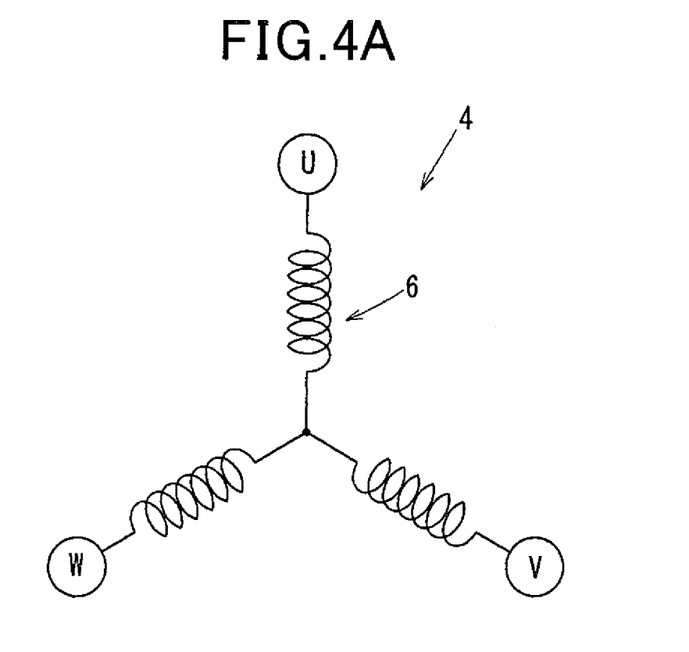
FIGS. 4A and 4B are connection diagrams respectively illustrating two examples of electrically connecting phase windings of the stator coil.

Furthermore, in the present embodiment, as shown in FIG. 4A, the stator coil 4 is comprised of three phase windings, i.e., a U-phase winding, a V-phase winding and a W-phase winding. Each of the U-phase, V-phase and W-phase windings is formed of one wire member 6. The U-phase, V-phase and W-phase windings are star-connected to define a neutral point therebetween.

Figure 4B:
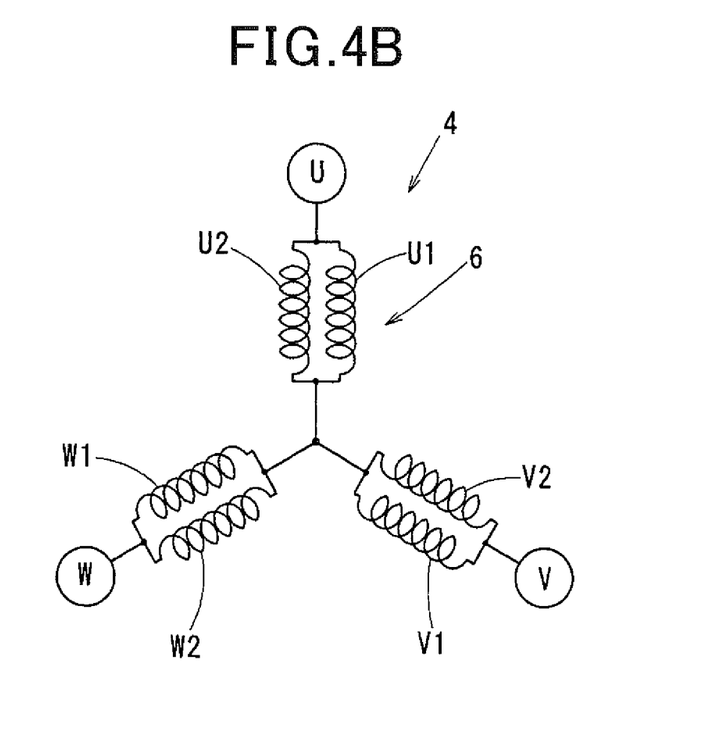

In addition, as shown in FIG. 4B, the stator coil 4 may be alternatively comprised of six phase windings, i.e., a pair of U-phase windings U1 and U2 connected parallel to each other, a pair of V-phase windings V1 and V2 connected parallel to each other and a pair of W-phase windings W1 and W2 connected parallel to each other. Each of the six phase windings is formed of one wire member 6.

Next, the outstanding features of the stator 1 according to the present embodiment will be described in detail.

In the present embodiment, for at least one of the phase windings of the stator coil 4, the circumferential pitch (NP/2) between the in-slot portions 10 is adjusted by adjusting the oblique angles of the first and second oblique parts 11 and 12 of the coil end portions 7.

In addition, for the sake of convenience, the coil end portions 7 of the phase windings of the stator coil 4 have been described above as having a simple mountain-like shape as shown in FIGS. 2-3. However, in the present embodiment, the coil end portions 7 of the phase windings are actually formed to have a stepped mountain-like shape as shown in FIGS. 5A-8B, so as to be arranged in a smaller size and higher density on the stator core 3.

Figure 5A:
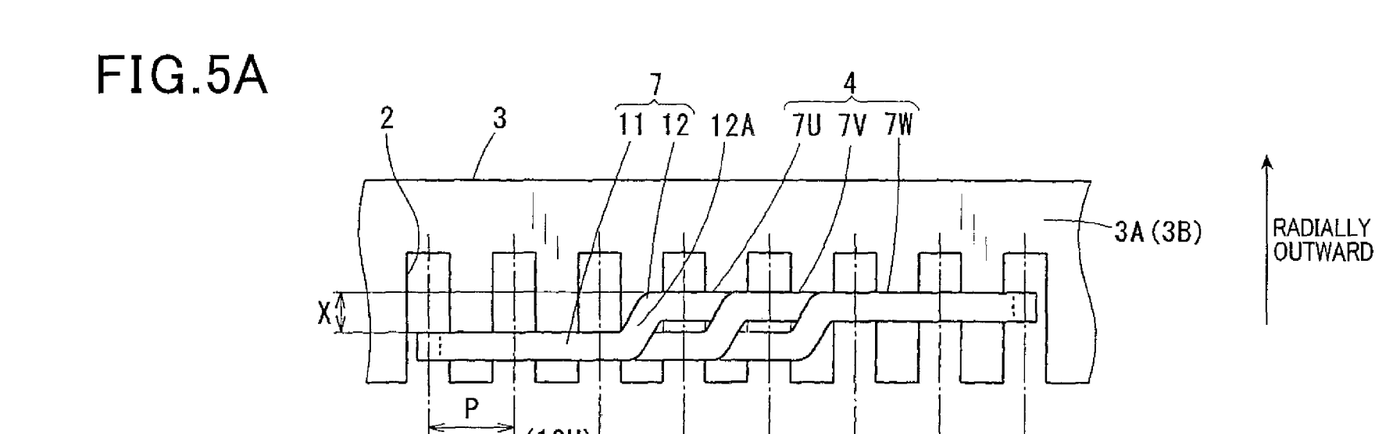
Figure 5B:
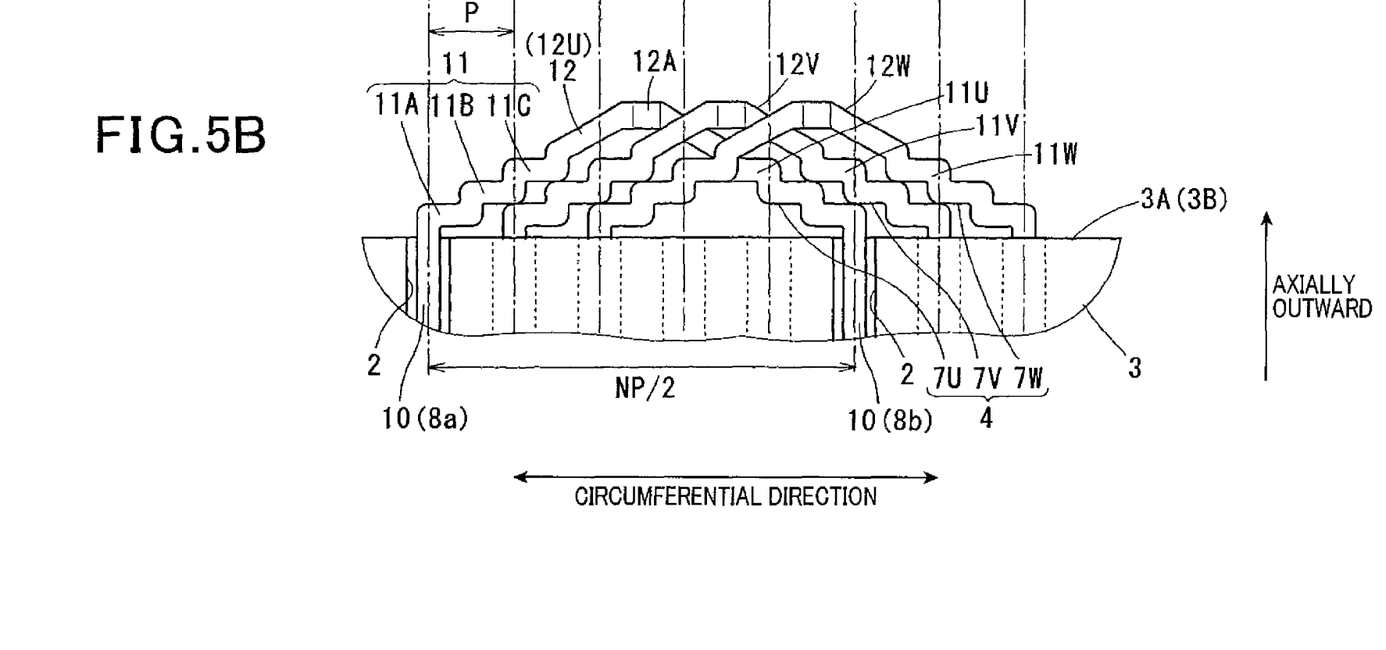

Specifically, as shown in FIGS. 5A-5B, each of the coil end portions 7 of the phase windings of the stator coil 4 has the second oblique part 12 formed at a central area thereof (or an apex area of the mountain-like shape) which is located furthest from a corresponding one of the axial side faces 3A and 3B of the stator core 3. Moreover, in the present embodiment, the second oblique part 12 is formed as a crank-shaped part 12A that is bent to radially offset the coil end portion 7 (or to radially offset the two in-slot portions 10 connected by the coil end portion 7 from each other). The amount X of radial offset made by the crank-shaped part 12A is set to be 1.0 to 1.3 times the width W of the phase winding (or the electric conductor).

In addition, it should be noted that the term "crank-shaped" is used hereinafter only for the purpose of describing the overall shape of the part 12A and does not restrict the internal angles between adjacent sections of the part 12A to 90°.

Moreover, each of the coil end portions 7 has the pair of first oblique parts 11 formed respectively on opposite sides of the second oblique part 12 so as to be symmetrical with respect to the second oblique part 12. In the present embodiment, each of the first oblique parts 11 is stair-shaped to include three step parts 11A, 11B and 11C. The three step parts 11A-11C are formed respectively at three different axial positions so as to each extend substantially parallel to the corresponding axial end face 3A or 3B of the stator core 3.

In addition, it should be noted that the expression "substantially parallel" used hereinafter is intended to encompass both the case of the step parts 11A-11C extending exactly parallel to the corresponding axial end face 3A or 3B of the stator core 3 and the case of the step parts 11A-11C extending approximately parallel to the corresponding axial end face 3A or 3B to the extent that the axial length (or height) of the coil end portions 7 can be reduced.

For the sake of convenience of explanation, hereinafter, the three step parts 11A-11C will be sequentially referred to as the first step part 11A, the second step part 11B and the third step part 11C from the side of the corresponding axial end face 3A or 3B of the stator core 3. Moreover, for differentiating the three phases of the stator coil 4, the portions and parts of the U-phase winding are suffixed with "U"; the portions and parts of the V-phase winding are suffixed with "V"; the portions and parts of the W-phase winding are suffixed with "W".

In the present embodiment, the circumferential lengths of the first to the third step parts 11A-11C are set to be less than or equal to the slot pitch P (i.e., the interval between each circumferentially-adjacent pair of the slots 2 of the stator core 3). Consequently, it is possible to prevent interference between each pair of the coil end portions 7U, 7V and 7W which respectively protrude from one circumferentially-adjacent pair of the slots 2 of the stator core 3. As a result, it is possible to prevent both the axial length and radial width of the coil end portions 7U, 7V and 7W from being increased for preventing the above-described interference.

Moreover, the coil end portions 7U-7W overlap one another at the first to the third step parts 11A-11C thereof in the axial direction of the stator core 30. For example, for one pair of the coil end portions 7U and 7V which respectively protrude from one circumferentially-adjacent pair of the slots 2 of the stator core 3, the second step part 11B of the coil end portion 7U and the first step part 11A of the coil end portion 7V overlap each other in the axial direction of the stator core 3; the third step part 11C of the coil end portion 7U and the second step part 11B of the coil end portion 7V overlap each other in the axial direction; the second oblique part 12U of the coil end portion 7U and the third step part 11C of the coil end portion 7V overlap each other in the axial direction.

In addition, between each overlapping pair of the parts of the coil end portions 7U-7W, there is provided a predetermined axial gap so as to prevent interference therebetween. For example, the predetermined axial gap is provided between the second step part 11B of the coil end portion 7U and the first step part 11A of the coil end portion 7V.

In the present embodiment, the stator coil 4 is mounted on the stator core 3 in a pattern such that the coil end portions 7 of each of the U-phase, V-phase and W-phase windings are radially offset by the respective second oblique parts 12 at different circumferential positions from the coil end portions 7 of the other phase windings.

Moreover, it is desirable that all the U-phase, V-phase and W-phase windings (or the wire members 6) of the stator coil 4 are formed of the electric conductors of the same specification into the same shape.

However, due to the dimensional tolerances of the electric conductors before being shaped and the manufacturing tolerances caused during the shaping of the electric conductors, it is impossible for the resultant U-phase, V-phase and W-phase windings to have exactly the same shape and dimensions. In other words, there exist dimensional deviations of the U-phase, V-phase and W-phase windings from desired (or ideal) dimensions. Consequently, in mounting the stator coil 4 to the stator core 3, an undesirable load may be imposed on the stator coil 4, thereby lowering the insulating properties of the stator coil 4.

In particular, when the circumferential pitch (NP/2) between the in-slot portions 10 (or straight portions 8a and 8b) is deviated from a desired value, the coil end portions 7 of the U-phase, V-phase and W-phase windings may interfere with each other and variation may occur in the abutting loads between the side surfaces of the electric conductors forming the U-phase, V-phase and W-phase windings and the inner wall surfaces of the slots 2 of the stator core 3.

The inventor of the present invention has found that it is possible to correct deviation of the circumferential pitch (NP/2) while keeping the axial length and radial width of the coil end portions 7 of the U-phase, V-phase and W-phase windings almost unchanged.

Figure 6A:
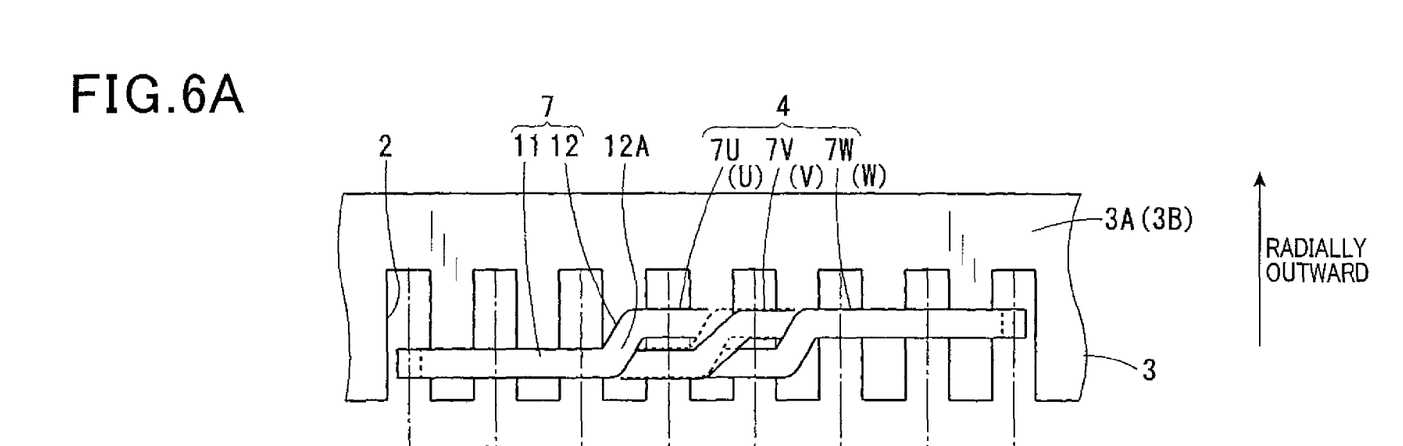
Figure 6B:
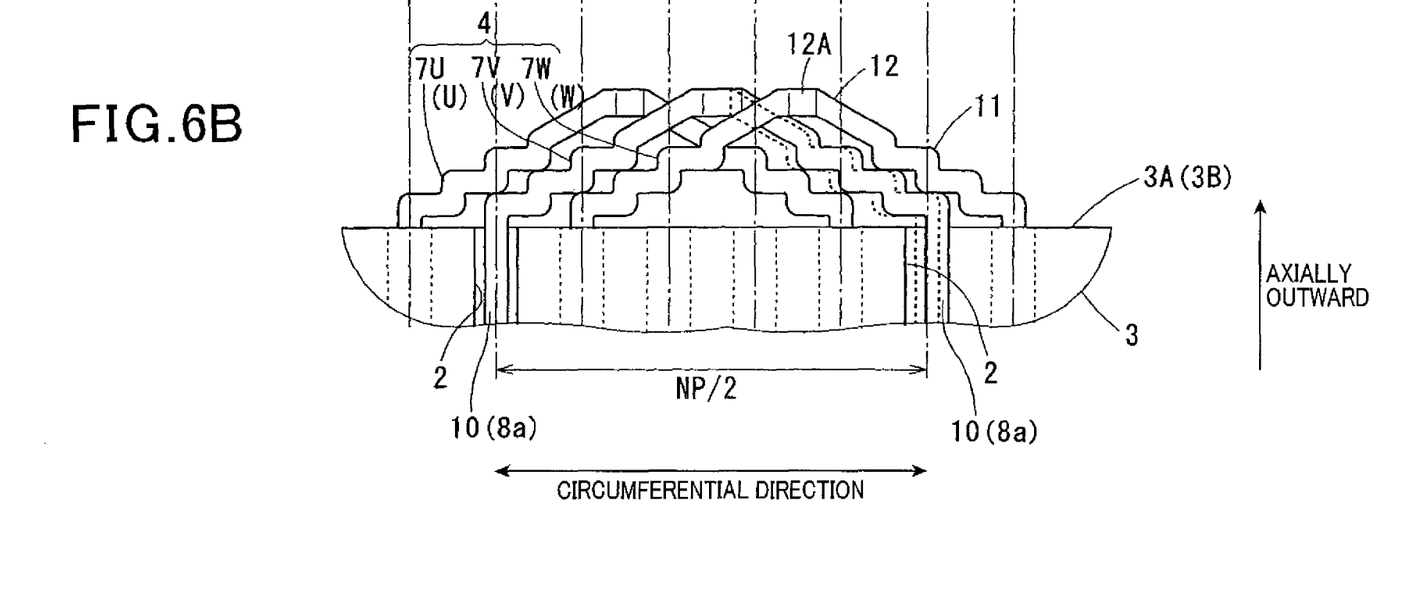
Figure 7A:
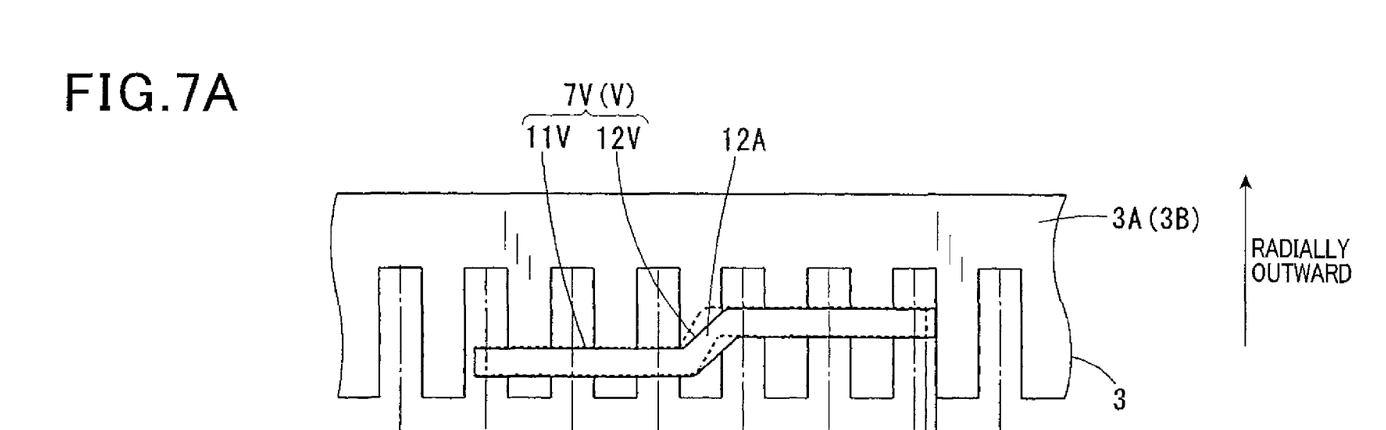
FIGS. 7A and 7B are enlarged views also illustrating the first method of adjusting the circumferential pitch, wherein only one coil end portion and one pair of the in-slot portions connected by the coil end portion are depicted.
Figure 7B:
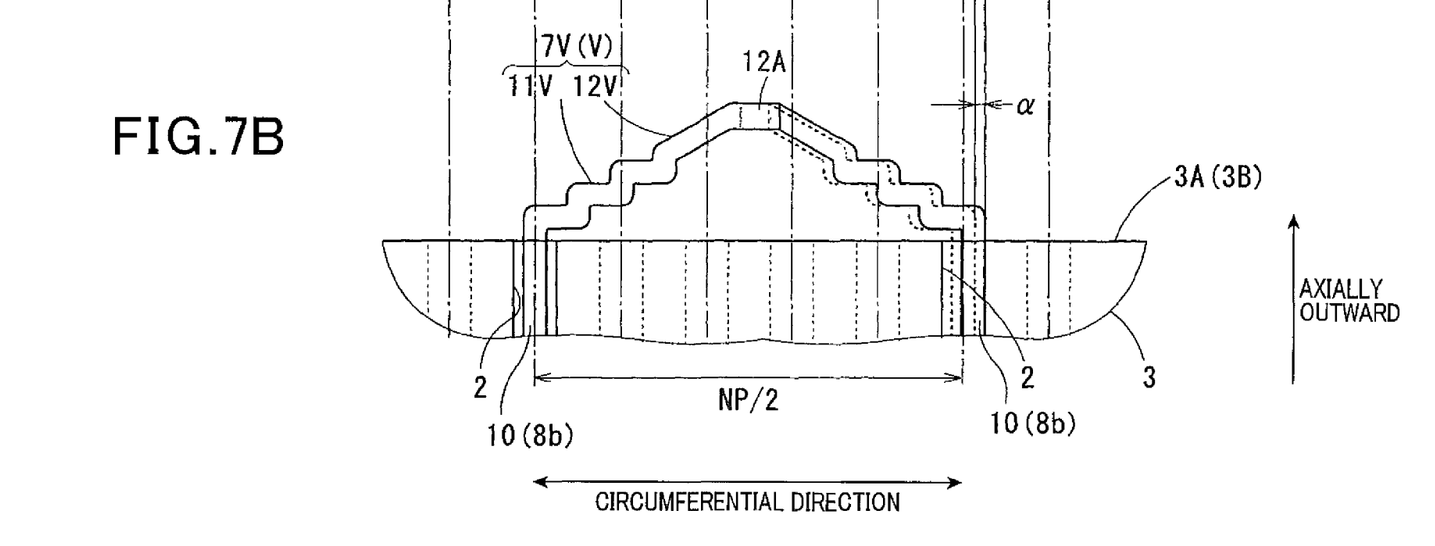

Specifically, referring to FIGS. 6A-6B, the circumferential pitch (NP/2) represents the circumferential interval between each adjacent pair of the in-slot portions 10 (or straight portions 8a and 8b). The circumferential pitch (NIP) also represents the circumferential length (or bridging length) of the coil end portions 7. As described previously, in the present embodiment, each of the coil end portions 7 includes the pair of first oblique parts 11 extending obliquely with respect to the axial direction of the stator core 3 and the second oblique part 12 extending obliquely with respect to the radial direction of the stator core 3. The inventor has found that it is possible to adjust the circumferential pitch (NP/2) by adjusting the oblique angles of the first oblique parts 11 with respect to the axial direction of the stator core 3 and/or the oblique angle of the second oblique part 12 with respect to the radial direction of the stator core 3.

FIGS. 6A-6B and 7A-7B illustrate a first method of adjusting the circumferential pitch (NP/2). According to the first method, the oblique angle of the second oblique part 12 is adjusted, thereby adjusting the circumferential pitch (NP/2).

More specifically, in the present embodiment, the second oblique part 12 is formed as the crank-shaped part 12A. By taking the V-phase winding as an example, when the oblique angle of the crank-shaped part 12A with respect to the radial direction of the stator core 3 is increased, the shape of the crank-shaped part 12A is changed from an initial shape indicated with dashed lines in FIGS. 6A-6B and 7A-7B to a shape indicated with solid lines in the same figures. Consequently, with the change in the shape of the crank-shaped part 12A, the circumferential length of the coil end portion 7V is increased by a. Accordingly, the circumferential pitch (NP/2) between the in-slot portions 10 is also increased by α. In contrast, when the oblique angle of the crank-shaped part 12A is reduced so that the shape of the crank-shaped part 12A is changed from an initial shape indicted with solid lines in FIGS. 6A-6B and 7A-7B to a shape indicated with dashed lines in the same figures, the circumferential length of the coil end portion 7V is reduced by α. Accordingly, the circumferential pitch (NP/2) between the in-slot portions 10 is also reduced by α.

Moreover, as seen from FIGS. 6A-6B and 7A-7B, the radial positions of the first oblique parts 11 and the height of the crank-shaped part 12A can be kept unchanged during the adjustment of the oblique angle of the crank-shaped part 12A.

Therefore, using the first method, it is possible to adjust the circumferential pitch (NP/2) by adjusting the oblique angle of the second oblique part 12 (i.e., the crank-shaped part 12A) while keeping the axial length and radial width of the coil end portions 7 almost unchanged.

Figure 8A:
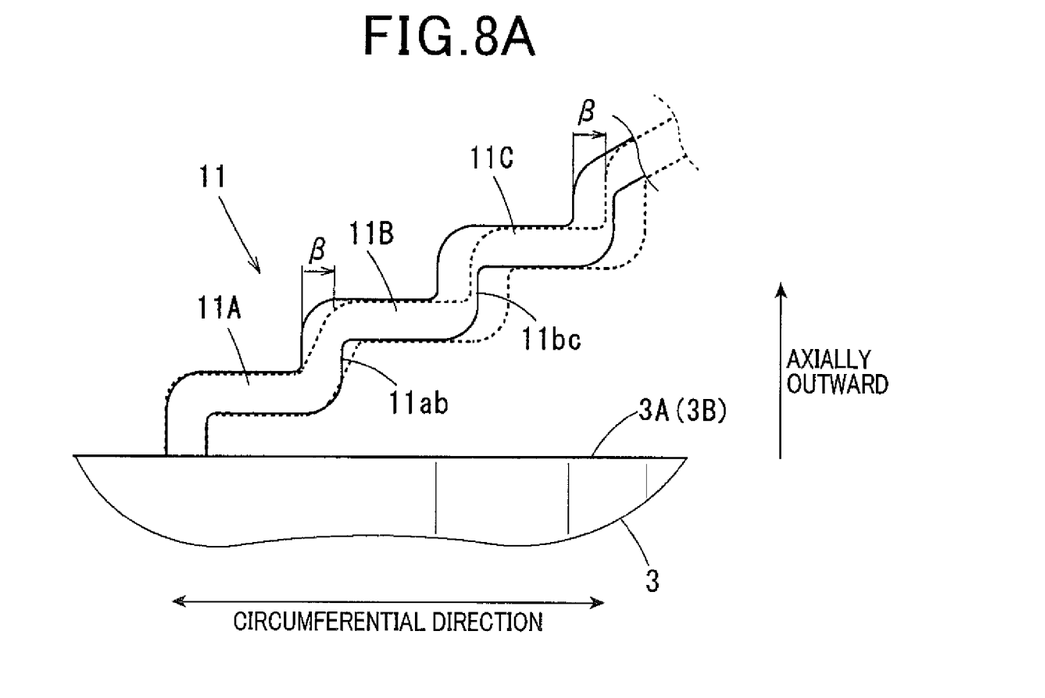
FIGS. 8A and 8B are enlarged views of part of the stator from the radially inside of the stator core, the enlarged views illustrating a second method of adjusting the circumferential pitch between the in-slot portions of each phase winding of the stator coil.
Figure 8B:
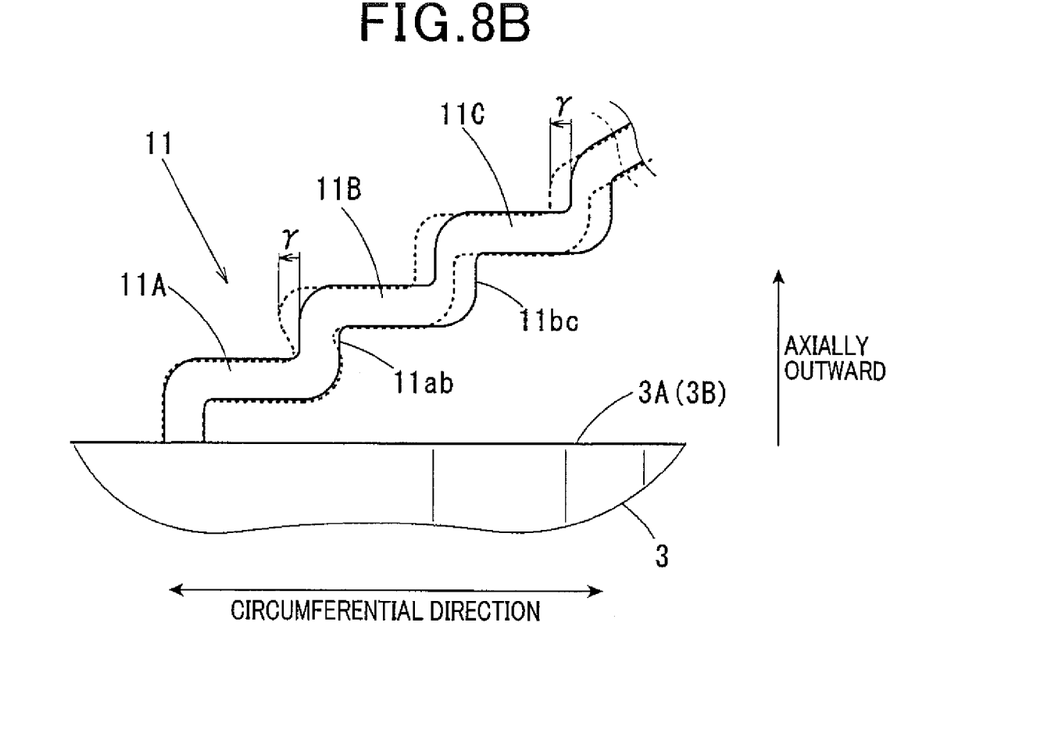

FIGS. 8A-8B illustrate a second method of adjusting the circumferential pitch (NP/2). According to the second method, the oblique angles of the first oblique parts 11 are adjusted, thereby adjusting the circumferential pitch (NP/2).

More specifically, in the present embodiment, each of the first oblique parts 11 is stair-shaped to include the first to the third step parts 11A-11C, a connection part 11ab connecting the first and second step parts 11A and 11B and a connection part 11bc connecting the second and third step parts 11B and 11C. When the connection part 11ab is displaced circumferentially inward so that the oblique angle of the connection part 11ab with respect to the axial direction of the stator core 3 is increased, the shape of the first oblique part 11 is changed from an initial shape indicated with solid lines in FIG. 8A to a shape indicated with dashed lines in the same figure. Consequently, with the change in the shape of the first oblique part 11, the circumferential length of the coil end portion 7 is increased by β. Accordingly, the circumferential pitch (NP/2) between the in-slot portions 10 is also increased by β. In contrast, when the connection part 11ab is displaced circumferentially outward, the shape of the first oblique part 11 is changed from an initial shape indicated with solid lines in FIG. 8B to a shape indicated with dashed lines in the same figure. Consequently, with the change in the shape of the first oblique part 11, the circumferential length of the coil end portion 7 is reduced by γ. Accordingly, the circumferential pitch (NP/2) between the in-slot portions 10 is also reduced by γ.

In addition, though not shown in the figures, the circumferential pitch (NP/2) between the in-slot portions 10 may also be adjusted by adjusting the oblique angle of the connection part 11bc with respect to the axial direction of the stator core 3. Further, the circumferential pitch (NP/2) between the in-slot portions 10 may also be adjusted by adjusting both the oblique angles of the connection parts 11ab and 11bc with respect to the axial direction of the stator core 3.

Furthermore, as seen from FIGS. 8A-8B, the radial positions and axial length of the first oblique parts 11 can be kept unchanged during the adjustment of the oblique angles of the first oblique parts 11.

Therefore, using the second method, it is possible to adjust the circumferential pitch (NP/2) by adjusting the oblique angles of the first oblique parts 11 while keeping the axial length and radial width of the coil end portions 7 almost unchanged.

In addition, it is also possible to adjust the circumferential pitch (NP/2) using both the first and second methods, i.e., by adjusting the oblique angle of the second oblique part 12 with respect to the radial direction of the stator core 3 as well as the oblique angles of the first oblique parts 11 with respect to the axial direction of the stator core 3.

In the present embodiment, deviation of the circumferential pitch (NP/2) is corrected by adjusting the oblique angles of the first oblique parts 11 and/or the oblique angle of the second oblique part 12. Consequently, in the finally-obtained stator 1, the oblique angles of the first and second oblique parts 11 and 12 in at least one of the U-phase, V-phase and W-phase windings are different from those in the other phase windings.

Moreover, in practice, deviation of the circumferential pitch (NP/2) can be corrected in either of the following two manners.

First, deviation of the circumferential pitch (NP/2) can be corrected before the electric conductors (or wire members 6) are shaped. More specifically, the stator coil 4 is generally mass-produced (or produced in lots). For example, each lot may include several hundreds of stator coils. Therefore, in a test production stage, it is possible to determine in which one of the U-phase, V-phase and W-phase windings the circumferential pitch (NP/2) is deviated from the desired value. Then, based on the test results, it is possible to set the manufacturing condition of the stator coil 4 so as to correct the deviation of the circumferential pitch (NP/2) prior to the shaping of the electric conductors. In addition, the manufacturing condition may include material properties of the electric conductors and the machines or devices used for manufacturing the stator coil 4.

Alternatively, deviation of the circumferential pitch (NP/2) can be corrected after the electric conductors (or wire members 6) are shaped. More specifically, after the shaping of the electric conductors, it is possible to determine in which one of the U-phase, V-phase and W-phase windings the circumferential pitch (NP/2) is deviated from the desired value. Then, for the determined one of the phase windings, it is possible to correct the deviation of the circumferential pitch (NP/2) by adjusting the oblique angles of the first oblique parts 11 and/or the oblique angle of the second oblique part 12.

The above-described stator 1 according to the present embodiment has the following advantages.

In the present embodiment, the stator 1 includes the hollow cylindrical stator core 3 and the three-phase stator coil 4. The stator core 3 has the slots 2 that are formed in the radially inner surface of the stator core 3 so as to be spaced from one another in the circumferential direction of the stator core 3. The stator coil 4 is comprised of the U-phase, V-phase and W-phase windings. Each of the U-phase, V-phase and W-phase windings is formed of one continuous electric conductor and includes the in-slot portions 10 and the coil end portions 7. Each of the in-slot portions 10 is received in the corresponding one of the slots 2 of the stator core 3. Each of the coil end portions 7 is located outside the slots 2 of the stator core 3 so as to connect one circumferentially-adjacent pair of the in-slot portions 10. The stator coil 4 is mounted on the stator core 3 so that for each of the U-phase, V-phase and W-phase windings, the radial positions of the in-slot portions 10 of the phase winding in the corresponding slots 2 alternate between the radially inner and outer positions in the circumferential direction of the stator core 3. Each of the coil end portions 7 of the U-phase, V-phase and W-phase windings includes the first and second oblique parts 11 and 12 each of which extends obliquely with respect to either the axial direction or the circumferential direction of the stator core 3. At least one of the oblique angles of the first and second oblique parts 11 and 12 in at least one of the U-phase, V-phase and W-phase windings (e.g., the V-phase winding in FIGS. 6A-7B) is set to be different from that in the other phase windings.

With the above configuration, when the circumferential pitch (NP/2) between the in-slot portions 10 is deviated from the desired value in at least one of the U-phase, V-phase and W-phase windings, it is possible to correct the deviation of the circumferential pitch (NP/2) by adjusting (or suitably setting) at least one of the oblique angles of the first and second oblique parts 11 and 12. That is, it is possible to correct the deviation of the circumferential pitch (NP/2) while keeping the axial length and radial width of the coil end portions 7 of the U-phase, V-phase and W-phase windings almost unchanged. Consequently, it is possible to prevent interference between the coil end portions 7 of the U-phase, V-phase and W-phase windings. Moreover, it is also possible to secure a suitable abutting load between the side surfaces of the electric conductors forming the U-phase, V-phase and W-phase windings and the inner wall surfaces of the slots 2, thereby preventing resonance of the stator coil 4 with vibration of the stator core 3 and improving the rigidity of the stator core 3. As a result, it is possible to secure a small size, high space factor and high reliability of the stator 1.

Moreover, in the present embodiment, each of the U-phase, V-phase and W-phase windings of the stator coil 4 is wave-shaped so that the coil end portions 7 of the phase winding are located alternately on opposite axial sides of the stator core 3 in the circumferential direction of the stator core 3.

That is, in the present embodiment, the stator coil 4 is wave-wound around the stator core 3. Therefore, it is particularly easy for interference to occur between the coil end portions 7 of the U-phase, V-phase and W-phase windings. However, as described previously, in the present embodiment, it is possible to correct deviation of the circumferential pitch (NP/2) while keeping the axial length and radial width of the coil end portions 7 of the U-phase, V-phase and W-phase windings almost unchanged. Consequently, it is still possible to reliably prevent interference between the coil end portions 7 of the U-phase, V-phase and W-phase windings.

In the present embodiment, each of the coil end portions 7 of the U-phase, V-phase and W-phase windings of the stator coil 4 has the mountain-like shape tapering axially outward. Further, each of the coil end portions 7 includes the pair of first oblique parts 11 and the second oblique part 12. Each of the first oblique parts 11 extends obliquely with respect to the axial direction of the stator core 3 and constitutes one side of the mountain-like shape of the coil end portion 7. The second oblique part 12 extends obliquely with respect to the radial direction of the stator core 3 and constitutes the apex of the mountain-like shape which connects the pair of first oblique parts 11.

With the above configuration, it is possible to correct deviation of the circumferential pitch (NP/2) by adjusting either or both of the oblique angles of the first oblique parts 11 and the oblique angle of the second oblique part 12.

In the present embodiment, each of the first oblique parts 11 is stair-shaped to include the first to the third step parts 11A-11C that each extend substantially parallel to the corresponding axial end face 3A or 3B of the stator core 3 and are spaced from one another in the axial direction of the stator core 3.

With the above configuration, it is possible to more effectively correct deviation of the circumferential pitch (NP/2) by adjusting the oblique angles of the connection parts 11ab and 11bc that respectively connect adjacent pairs of the step parts 11A-11C.

While the above particular embodiment has been shown and described, it will be understood by those skilled in the art that various modifications, changes, and improvements may be made without departing from the spirit of the invention.

For example, in the previous embodiment, the stator coil 4 is wave-wound around the stator core 3. However, the stator coil 4 may be wound around the stator core 3 in other distributed winding manners.

In the previous embodiment, the phase windings of the stator coil 4 are star-connected. However, the phase windings of the stator coil 4 may also be Δ-connected.

In the previous embodiment, the number of phases of the stator coil 4 is equal to 3. However, the number of phases of the stator coil 4 may be equal to 2 or 4 or more.

In the previous embodiment, each of the first oblique parts 11 is stair-shaped to include the first to the third step parts 11A-11C. In other words, the number of step parts in each of the first oblique parts 11 is equal to 3. However, the number of step parts in each of the first oblique parts 11 may also be set to be equal to 2 or 4 or more.

In the previous embodiment, the coil end portions 7 of the U-phase, V-phase and W-phase windings are formed to have the stepped mountain-like shape as shown in FIGS. 5A-8B. However, the coil end portions 7 may also be formed to have the simple mountain-like shape as shown in FIGS. 2-3. In this case, the first oblique parts 11 of the coil end portions 7 are straight in shape, i.e., not stair-shaped.

Figure 9:
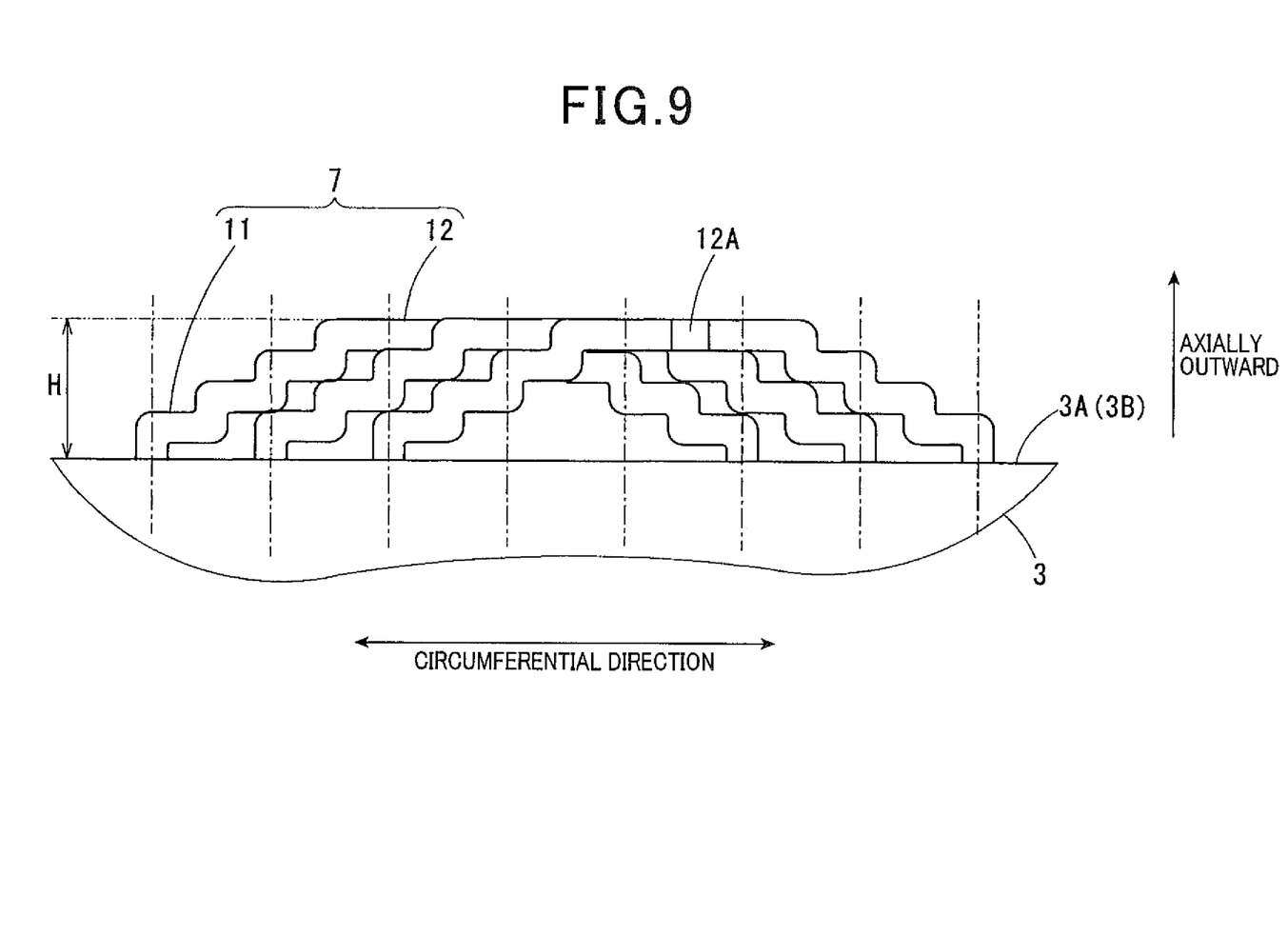
FIG. 9 is an enlarged view illustrating the configuration of a stator coil according to a modification.

In the previous embodiment, the second coil end parts 12 of the coil end portions 7 are formed to taper axially outward (see FIG. 5B). However, the second coil end parts 12 of the coil end portions 7 may also be formed to extend substantially parallel to the corresponding axial end face 3A or 3B of the stator core 3, as shown in FIG. 9. In this case, it is possible to further reduce the axial length H of the coil end portions 7.

In the previous embodiment, the present invention is applied to the stator 1 for the automotive alternator G. However, the present invention can also be applied to stators for other rotating electric machines, such as a stator for an electric motor or a stator for a motor-generator that can selectively function either as an electric motor or as an electric generator.

What is claimed is:

1. A stator for a rotating electric machine, the stator comprising:
    a hollow cylindrical stator core having a plurality of slots that are formed in a radially inner surface of the stator core so as to be spaced from one another in a circumferential direction of the stator core; and
    a multi-phase stator coil comprised of a plurality of phase windings, each of the phase windings being formed of a continuous electric conductor and including a plurality of in-slot portions and a plurality of coil end portions, each of the in-slot portions being received in a corresponding one of the slots of the stator core, each of the coil end portions being located outside the slots of the stator core so as to connect one circumferentially-adjacent pair of the in-slot portions,
    wherein
    the stator coil is mounted on the stator core so that for each of the phase windings, radial positions of the in-slot portions of the phase winding in the corresponding slots alternate between a radially inner position and a radially outer position in the circumferential direction of the stator core,
    each of the coil end portions of the phase windings includes at least one oblique part that extends obliquely at an oblique angle with respect to either an axial direction of the stator core or the circumferential direction of the stator core,
    the oblique angles of the oblique parts of the coil end portions in at least one of the phase windings of the stator coil are set to be different from the oblique angles of the oblique parts of the coil end portions in the other phase windings that are located a same distance from a corresponding axial end face of the stator core as the oblique parts of the coil end portions in the at least one of the phase windings,
    each of the coil end portions of the phase windings of the stator coil has a mountain-like shape tapering axially outward,
    for each of the coil end portions of the phase windings, the at least one oblique part of the coil end portion comprises a pair of first oblique parts and one second oblique part,
    each of the first oblique parts extends obliquely with respect to the axial direction of the stator core and constitutes one side of the mountain-like shape of the coil end portion,
    the second oblique part extends obliquely with respect to a radial direction of the stator core and constitutes an apex of the mountain-like shape which inter-connects the pair of first oblique parts, and
    the oblique angles of the second oblique parts of the coil end portions in the at least one of the phase windings of the stator coil are set to be different from the oblique angles of the second oblique parts of the coil end portions in the other phase windings.

2. The stator as set forth in claim 1, wherein each of the phase windings of the stator coil is wave-shaped so that the coil end portions of the phase winding are located alternately on opposite axial sides of the stator core in the circumferential direction of the stator core.

3. The stator as set forth in claim 1, wherein the oblique angles of the first oblique parts of the coil end portions in the at least one of the phase windings of the stator coil are set to be different from the oblique angles of the first oblique parts of the coil end portions in the other phase windings.

4. The stator as set forth in claim 1, wherein each of the first oblique parts is stair-shaped to include a plurality of step parts that each extend substantially parallel to the corresponding axial end face of the stator core and are spaced from one another in the axial direction of the stator core.

5. The stator as set forth in claim 1, wherein the second oblique part extends substantially parallel to the corresponding axial end face of the stator core.

* * * * *